United States Patent
Fujibayashi

4,176,914

Dec. 4, 1979

[54] COMPACT RETROFOCUS WIDE ANGLE OBJECTIVE

[75] Inventor: Kazuo Fujibayashi, Yokohama, Japan

[73] Assignee: Canon Kabushiki Kaisha, Tokyo, Japan

[21] Appl. No.: 906,852

[22] Filed: May 17, 1978

[30] Foreign Application Priority Data

May 26, 1977 [JP] Japan .................................. 52-61467

[51] Int. Cl.² .............................................. G02B 9/64
[52] U.S. Cl. .................................... 350/214; 350/176
[58] Field of Search ................................ 350/214, 176

[56] References Cited
U.S. PATENT DOCUMENTS

| | | | |
|---|---|---|---|
| 3,874,770 | 4/1975 | Shimizu | 350/214 |
| 4,046,459 | 9/1977 | Kawamura | 350/214 |

*Primary Examiner*—Paul A. Sacher
*Attorney, Agent, or Firm*—Toren, McGeady and Stanger

[57] ABSTRACT

A wide angle objective lens with an angular field coverage of 76° and a relative aperture of 1:2.8, comprising seven members of which the first and second (counting from the front) are negative meniscuses of forward convexity, the third is positive with the front surface more strongly curved than the rear one and convex toward the front, the fourth is bi-convex, the fifth is bi-concave, and the sixth and seventh are positive meniscuses of rearward convexity. This lens is shortened in the longitudinal direction and the diameter of the first member is smaller. By the shortening of the dimensions of the lens, it is increasing in the halo due to the sagittal rays. In order to diminish the increased halo it is restricted optimumly the reduced air space between the second and fourth members which affects the incident height of the marginal ray on the fourth member.

1 Claim, 2 Drawing Figures

COMPACT RETROFOCUS WIDE ANGLE OBJECTIVE

This invention relates to photographic objectives, and more particularly to a wide angle objective having a long back focus suited for use in a single lens reflex camera.

Wide angle objectives when in the retrofocus type, though being advantageous for an increase in the back focal length, tend to give rise to a very difficult aberrational problem for distortion, coma and particularly halo due to the sagittal rays because of the requirement of employing a strongly divergent lens members at the front part. To avoid a considerable drop in image quality, therefore, the conventional design features are that the suitable arrangement of the lens members that follow the front member is combined with the simultaneous elongation of the complete objective in the longitudinal direction to reduce the absolute amount of aberrations ascribable to the individual lens members, and that the number of lens members in the complete objective is increased to facilitate correction of aberrations.

A retrofocus wide angle objective lens which is well corrected for the various aberrations has been proposed in U.S. Pat. No. 4,046,459 assigned to the assignee of the present invention. With this lens when shortened by 10% in the longitudinal length and at the same time in the diameter of the front member, however, it has been found that the halo due to the sagittal rays becomes serious. The use of special and expensive glass materials in making the lens elements is effective to improve the image quality, but will lead to an increase in the production cost.

Accordingly, the present invention aims at affording optimum correction for the various aberrations including halo due to the sagittal rays by making the lens arrangement appropriately selected.

For this purpose, two negative meniscus lens members are arranged in the foremost section of the objective, and are spaced from each other by as close a distance as is needed to achieve a minimization of the size of the objective in the total length and in the diameter of the front members. In such compact objective, the two negative meniscus lens members tend to produce remarkable halo of the sagittal rays which can be balanced out by the suitable design of the following lens members.

Figure 1:
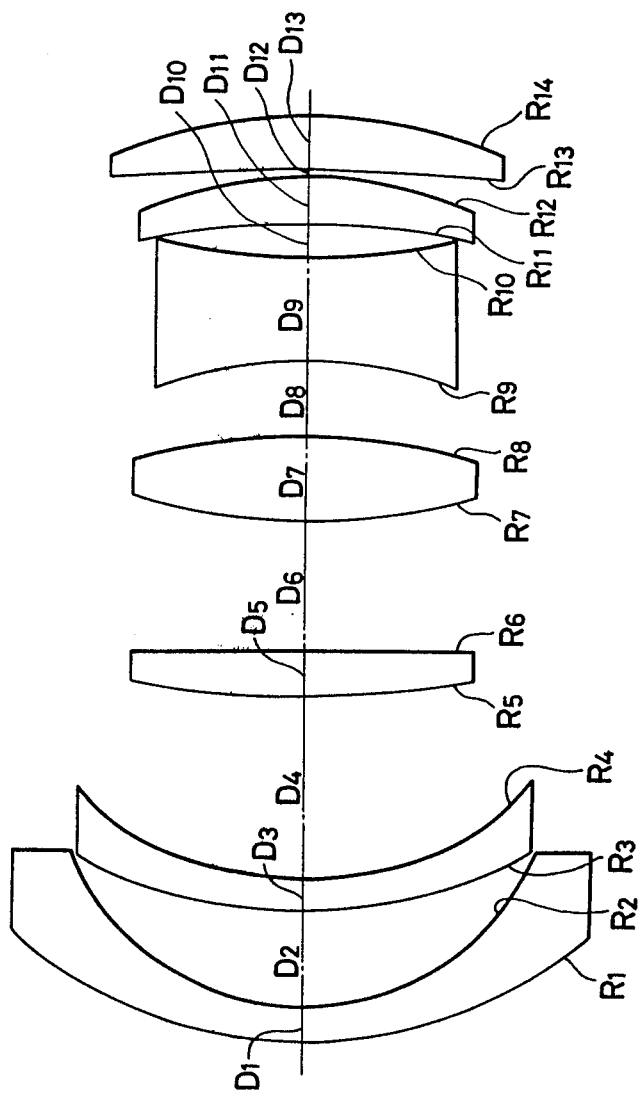
FIG. 1 is cross-sectional view of a preferred embodiment of the present invention.

One example of a specific wide angle objective lens of the present invention is represented in the drawing with FIG. 1 showing a lens block diagram wherein the first and second negative meniscus lens members (counting from the front) are convex toward the front and followed by a third lens member of positive power, in this instance, of bi-convexity as near as plano-convexity, a fourth lens member of bi-convexity, a fifth lens member of bi-concavity, a sixth lens member of rearwardly convex meniscus form, and a seventh lens member of positive power, in this instance, of rearwardly convex meniscus form. A diaphragm is positioned in a space between the third and fourth lens members.

The data of the objective represented in FIG. 1 refer to a total focal length of 100, a relative aperture of 1:2.8 and an angular field of 76°, and are given in Table 1 for the radii of curvature, R, the axial thicknesses of the lens elements or the axial separations between the lens elements, D, along with the corresponding indices of refraction, Nd, for the spectral D line of sodium and the Abbe numbers, ∥d, for the lens elements.

Table 1 f = 100  F 1 : 2.8  2ω = 76°

| Surface No. | R | D | Nd | νd |
|---|---|---|---|---|
| 1 | 79.151 | 5.79 | 1.60311 | 60.7 |
| 2 | 44.593 | 14.21 | 1 | |
| 3 | 85.091 | 4.56 | 1.60311 | 60.7 |
| 4 | 54.902 | 27.54 | 1 | |
| 5 | 184.03 | 7.09 | 1.69895 | 30.1 |
| 6 | −7813.7 | 19.86 | 1 | |
| 7 | 120.79 | 12.35 | 1.7725 | 49.6 |
| 8 | −107.45 | 11.33 | 1 | |
| 9 | −86.095 | 15.79 | 1.80518 | 25.4 |
| 10 | 113.87 | 5.09 | 1 | |
| 11 | −131.19 | 7.47 | 1.713 | 53.9 |
| 12 | −65.814 | 0.7 | 1 | |
| 13 | −479.44 | 8.14 | 1.7725 | 49.6 |
| 14 | −96.351 | | 1 | |

∥D = 139.92
b.f = 127.3 (back-focus)

Figure 2:
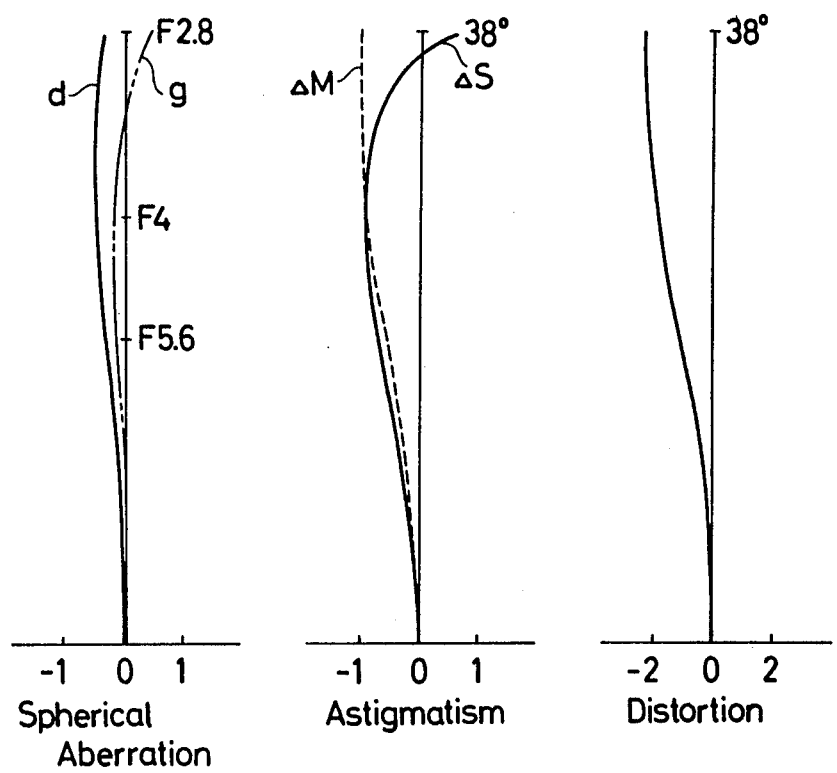
FIG. 2 is aberrations diagram of the lens of FIG. 1.

The values of 3rd-order aberration coefficients of the objective of FIG. 1 are compiled in Table 2 for lateral chromatic aberration L, longitudinal chromatic aberration T, spherical aberration SA, coma CM, astigmatism AS, Petzval sum PT and distortion DS. The spherical aberration, astigmatism and distortion of the objective of FIG. 1 are graphically represented in FIG. 2.

Table 2

| Surface No. | L | T | SA | CM |
|---|---|---|---|---|
| 1 | 0.009683 | 0.002599 | 0.473995 | 0.127241 |
| 2 | −0.020377 | 0.002234 | −6.186963 | 0.678250 |
| 3 | 0.014408 | 0.002666 | 2.114452 | 0.391310 |
| 4 | −0.022932 | −0.000305 | −8.845863 | −0.117759 |
| 5 | 0.039077 | 0.013206 | 2.911235 | 0.983846 |
| 6 | −0.010239 | −0.016902 | −0.071260 | −0.117633 |
| 7 | 0.025201 | 0.011208 | 2.215402 | 0.985291 |
| 8 | 0.041691 | −0.009076 | 13.670529 | −2.976118 |
| 9 | −0.081376 | 0.014070 | −13.700771 | 2.368811 |
| 10 | −0.043716 | −0.030729 | −1.865837 | −1.311551 |
| 11 | −0.004672 | 0.008612 | 0.024141 | −0.044499 |
| 12 | 0.025822 | −0.003505 | 3.378902 | −0.458648 |
| 13 | −0.006267 | 0.009460 | −0.049145 | 0.074183 |
| 14 | 0.032356 | −0.002291 | 6.894154 | −0.488230 |
| Sum | −0.001342 | 0.001246 | 0.962971 | 0.094493 |

| | AS | PT | DS |
|---|---|---|---|
| | 0.034157 | 0.475556 | 0.136829 |
| | −0.074354 | −0.844094 | 0.100685 |
| | 0.072417 | 0.442358 | 0.095267 |
| | −0.001568 | −0.685598 | −0.009148 |
| | 0.332489 | 0.223667 | 0.187952 |
| | −0.194183 | 0.005268 | −0.311852 |
| | 0.438204 | 0.360999 | 0.355442 |
| | 0.647910 | 0.405817 | −0.229400 |
| | −0.409558 | −0.518345 | 0.160431 |
| | −0.921928 | −0.391911 | −0.923536 |
| | 0.082025 | −0.317436 | 0.433931 |
| | 0.062256 | 0.632759 | −0.094340 |
| | −0.111977 | −0.090950 | 0.306312 |
| | 0.034576 | 0.452565 | −0.034498 |
| | −0.009533 | 0.150653 | 0.174074 |

What is claimed is:

1. A retrofocus wide angle objective lens comprising seven lenses arranged on a common optical axis and of which the first and second counting from the front are negative meniscus lenses convex toward the front, the third is a positive lens convex toward the front, the fourth is a bi-convex lens, the fifth is a bi-concave lens, and the sixth and the seventh are positive meniscus lenses convex toward the rear, said system being characterized by the following numerical values for the radii of curvature, R, the axial thicknesses or the axial separations, D, the refractive indices, Nd, and the Abbe numbers, νd:

| Surface No. | R | D | Nd | νd |
|---|---|---|---|---|
| 1 | 79.151 | 5.79 | 1.60311 | 60.7 |
| 2 | 44.593 | 14.21 | 1 | |

-continued

| Surface No. | R | D | Nd | νd |
|---|---|---|---|---|
| 3 | 85.091 | 4.56 | 1.60311 | 60.7 |
| 4 | 54.902 | 27.54 | 1 | |
| 5 | 184.03 | 7.09 | 1.69895 | 30.1 |
| 6 | −7813.7 | 19.86 | 1 | |
| 7 | 120.79 | 12.35 | 1.7725 | 49.6 |
| 8 | −107.45 | 11.33 | 1 | |
| 9 | −86.095 | 15.79 | 1.80518 | 25.4 |
| 10 | 113.87 | 5.09 | 1 | |
| 11 | −131.19 | 7.47 | 1.713 | 53.9 |
| 12 | −65.814 | 0.7 | 1 | |
| 13 | −479.44 | 8.14 | 1.7725 | 49.6 |
| 14 | −96.351 | | 1 | |

* * * * *